US010360720B1

(12) United States Patent
Nevraev et al.

(10) Patent No.: US 10,360,720 B1
(45) Date of Patent: Jul. 23, 2019

(54) HYBRID RAYTRACING APPROACH FOR MODELING LIGHT REFLECTION

(71) Applicant: Microsoft Technology Licensing, LLC, Redmond, WA (US)

(72) Inventors: Ivan Nevraev, Redmond, WA (US); James D. Stanard, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/902,926

(22) Filed: Feb. 22, 2018

(51) Int. Cl.
*G06T 15/06* (2011.01)

(52) U.S. Cl.
CPC .................................. *G06T 15/06* (2013.01)

(58) Field of Classification Search
None
See application file for complete search history.

(56) References Cited

PUBLICATIONS

U.S. Appl. No. 62/547,679, filed Aug. 18, 2017, Stanard et al.
U.S. Appl. No. 15/818,540, filed Nov. 20, 2017, Stanard et al.
U.S. Appl. No. 15/862,521, filed Jan. 4, 2018, Stanard et al.
Afra et al., "Stackless Multi-BVH Traversal for CPU, MIC and GPU Ray Tracing," *Computer Graphics Forum*, 11 pp. (2013).
Aila et al., "Understanding the Efficiency of Ray Traversal on GPUs," *Proceedings of High-Performance Graphics 2009*, 5 pp. (2009).
Gunther et al., "Realtime Ray Tracing on GPU with BVH-based Packet Traversal," *IEEE Eurographics Symposium on Interactive Ray Tracing 2007*, 6 pp. (2007).
Hapala et al., "Efficient Stack-less BVH Traversal for Ray Tracing," *SCCG 2001 Conference Proceedings*, pp. 29-34 (2011).
Havel et al., "Yet Faster Ray-Triangle Intersection (Using SSE4)," *IEEE Trans. on Visualization and Computer Graphics*, vol. 16, Issue 3, 5 pp. (Jul. 2010).
Karras, "Thinking Parallel, Part II: Tree Traversal on the GPU," downloaded from the World Wide Web, 13 pp. (2012).
Laine, "Restart Trail for Stackless BVH Traversal," *High Performance Graphics*, 5 pp. (2010).
Lohr, "GPU-based Parallel Stackless BVH Traversal for Animated Distributed Ray Tracing," 6 pp. (2010).
Möller et al., "Fast, Minimum Storage Ray / Triangle Intersection," *Journal of Graphics Tools*, vol. 2, 7 pp. (Oct. 1997).
"Ray-triangle Intersection," downloaded from the World Wide Web, 4 pp. (Oct. 2012).
Scratchapixel 2.0, "Ray Tracing: Rendering a Triangle," 52 pp. (undated—document downloaded on Nov. 20, 2017).
Wikipedia, "Bounding Volume Hierarchy," 4 pp. (downloaded from the World Wide Web on Jan. 4, 2018).
Wikipedia, "Plücker Coordinates," 8 pp. (document marked Nov. 2017).
Wikipedia, "Ray Tracing (Graphics)," 11 pp. (downloaded from the World Wide Web on Jan. 4, 2018).

*Primary Examiner* — Nicholas R Wilson

(74) *Attorney, Agent, or Firm* — Klarquist Sparkman, LLP

(57) ABSTRACT

Among the various embodiments disclosed herein are example methods for using real-time raytracing in a hybrid approach along with screen space reflections. In certain implementations, the two approaches are combined in a process that decides whether to use screen space reflections or raytracing for a given pixel during a preliminary analysis (pre-pass) of the pixel to be rendered.

16 Claims, 11 Drawing Sheets
(5 of 11 Drawing Sheet(s) Filed in Color)

```
bool WillSSRHitAnything(
    float4x4 viewProjection,
    float4 ndcRayOrigin,
    float3 worldRayOrigin,
    float3 worldRayDirection)
{
    // Use some bigger length to make the NDC math more stable
    float4 ndcRayEnd = mul(viewProjection, float4(worldRayOrigin + 10 * worldRayDirection, 1));
    ndcRayEnd.xyz /= ndcRayEnd.w;

float ndcRayDirectionAlongDepth = ndcRayEnd.z - ndcRayOrigin.z;

// less than (<) becuase of inverted Z that MiniEngine uses
    return (ndcRayDirectionAlongDepth < 0);
}
```

HYBRID RAYTRACING APPROACH FOR MODELING LIGHT REFLECTION

FIELD

This application relates to computationally efficient approaches to rendering reflections in three-dimensional computer graphics environments.

BACKGROUND

In a three-dimensional ("3D") computer graphics environment, the accurate rendering of reflective surfaces is highly desirable in creating an immersive, believable experience. For instance, reflective surfaces in an environment (e.g., a smooth, reflective floor or wall) desirably reflect other objects in the environments after accounting for all relevant factors, such as the location of light sources, the shape and location of the objects relative to the surface, and the position of the virtual camera.

Various techniques have been developed for modeling light reflection over the years. One of the most widely used techniques is known as "screen space reflections" or "SSR". As the name implies, screen space reflections is a technique that reuses screen space data to calculate reflections. However, because the SSR technique is limited to using screen space data, it can create numerous anomalies, artifacts, and/or omissions. For instance, if the data for the rendering of an accurate reflection is not present in the screen space, the SSR technique will fail and provide no pixel data for the proper rendering of the reflective surface. Accordingly, there is a need for improved techniques in rendering reflections in a 3D computer graphics environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Among the various embodiments disclosed herein are example methods for using real-time raytracing in a hybrid approach along with screen space reflections ("SSR"). In certain implementations, the two approaches are combined in a process that decides whether to use SSR or raytracing for a given pixel during a preliminary analysis (pre-pass) of the pixel to be rendered.

Further implementations concern optimization techniques for speeding-up raytracing by picking a majority direction on specular surfaces with only a minor loss of quality. Still further, some techniques concern speeding up raytracing by tracing only a fraction of the rays and using those rays (or interpolated or filtered versions of those rays) for neighboring pixels.

In one example embodiment, for instance, a list of reflection ray origins and directions is generated for a frame. Then, for a selected pixel having a reflection ray: (a) a determination is made as to whether the reflection ray for the selected pixel is reflected back to a virtual camera position of the frame; (b) if the reflection ray is determined to be reflected back to the virtual camera position of the frame, a raytracing technique is performed to generate a resulting pixel value for the reflection ray; and (c) if the selected reflection ray is determined not to be reflected back to the virtual camera position of the frame, a screen space reflection technique is performed to generate the resulting pixel value for the reflection ray. The frame can then be rendered using the resulting pixel value.

Further, in some implementations, the method further comprises, if the screen space reflection technique fails, performing the raytracing technique for the reflection ray. In further implementations, the determination of whether the reflection ray is reflected back to the virtual camera position for the frame comprises: computing a dot product; and evaluating whether a resulting scalar value from the dot product is positive or negative. The dot product can be, for example, the dot product of a view vector for the selected pixel and the reflection vector for the selected pixel. In other implementations, the determination of whether the reflection ray is reflected back to the virtual camera position for the frame is performed by: computing line segment endpoints comprising the origin of the reflected ray and a point along a direction of the reflected ray; transforming the line segment endpoints into a projected camera space; constructing a reflected-ray-in-projected-space from the line segments endpoints by subtracting one from another; and determining that a direction of the reflected-ray-in-projected-space is facing at the virtual camera, and thereby determining that the original reflected ray was reflected towards the virtual camera. In some example implementations, the reflection ray is determined to be reflected back to the virtual camera position of the frame, and the raytracing technique further comprises either: (a) using a reduced resolution image of the frame for the raytracing technique; or (b) selecting a representative normal for a group of pixel values neighboring the selected pixel.

In another example technique disclosed herein, a rendering technique is adaptively selected from among multiple available rendering techniques for use in rendering a pixel value representative of a reflection in a computer-generated environment. In this embodiment, the multiple available rendering techniques include a raytracing technique. In some example implementations, the multiple available rendering techniques further include a screen space reflection technique. The pixel value is then computed using the selected technique and can be buffered in a hardware buffer.

In some example implementations, the adaptively selecting the rendering technique comprises: determining whether a reflection ray from the pixel location is reflected toward a virtual camera position of the computer-generated environment; and selecting the rendering technique based at least in part on the determination of whether the reflection ray from the pixel location is reflected toward the virtual camera position of the computer-generated environment. In further example implementations, the adaptively selecting the rendering technique comprises: determining whether a reflection ray from the pixel location is reflected toward a virtual camera position of the computer-generated environment; selecting the raytracing technique if the reflection ray is reflected toward the virtual camera position; and selecting a second technique (e.g., a screen space reflection technique) other than the raytracing technique if the reflection ray is not reflected toward the virtual camera. Further, in some example implementations, when the screen space reflection technique is used, the method further comprises determining that the screen space reflection technique failed for the reflection ray; and performing a raytracing technique for the reflection ray for which the screen space reflection technique failed.

In a further example embodiment, a technique is selected from among multiple available techniques for rendering a pixel value in a frame of a computer-generated environment.

In this embodiment, the pixel value depicts a reflected ray in the frame of the computer-generated environment. Further, in this embodiment, the multiple available techniques for rendering the pixel value include a raytracing technique and a screen space reflection technique. The pixel value is then computed using the selected technique, and the frame is rendered using the computed pixel value.

In some example implementations, the method further comprises using a reduced resolution image of the frame for the raytracing technique (e.g., a one-quarter reduced or other reduced image for the pixel value). In further example implementations, the method further comprises selecting a representative normal for a group of pixel values neighboring the pixel value. In some cases, the representative normal is selected only after determining that the pixel value has a normal that is within a threshold percentage or distance of the group of pixel values.

The innovations described herein can be implemented as part of a method, as part of a computer system configured to perform the method or as part of a tangible computer-readable media storing computer-executable instructions for causing a computer system, when programmed thereby, to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 shows example code for a process for determining whether a reflected ray is reflected back toward a virtual camera origin for a frame.

DETAILED DESCRIPTION

I. General Considerations

Figure 1:
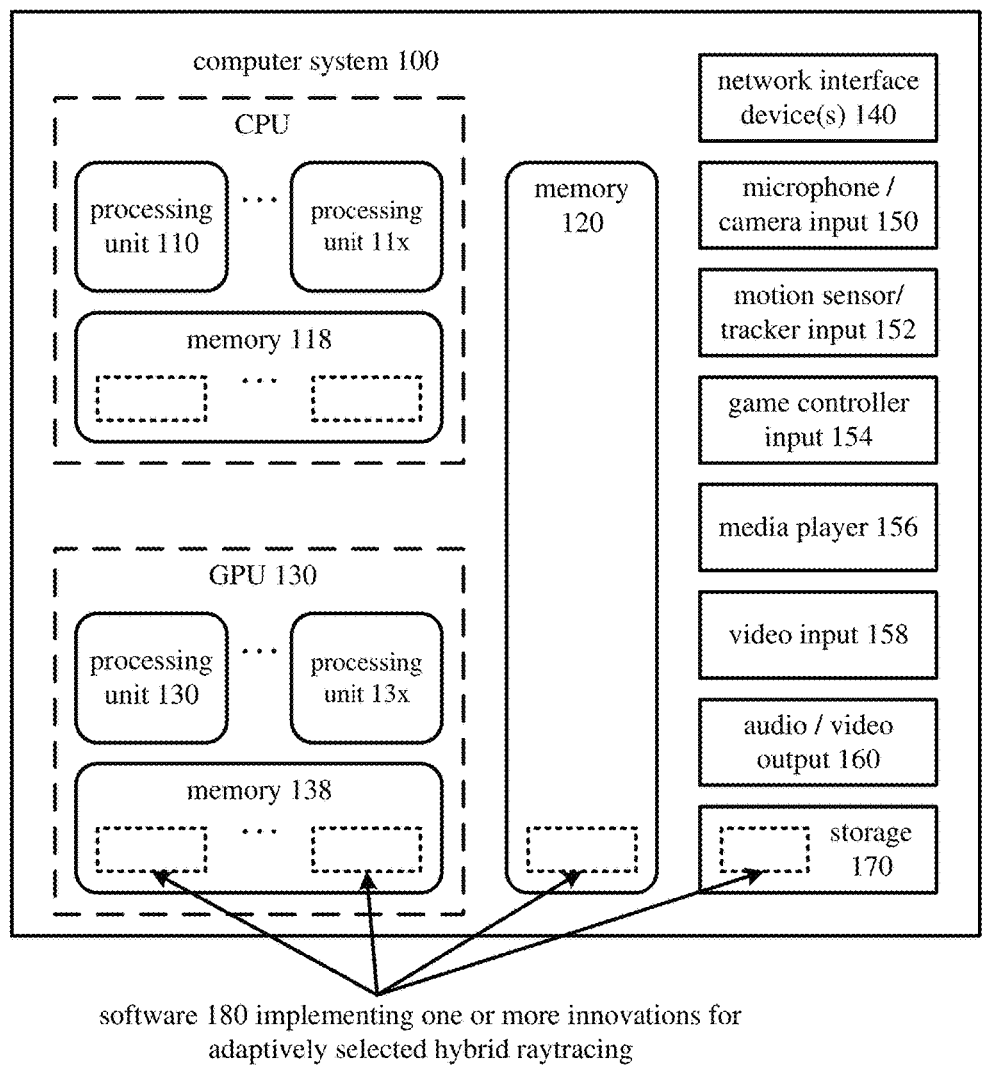
FIG. 1 is a diagram illustrating an example computer system in which one or more of the approaches described herein can be implemented.

Disclosed herein are representative embodiments of methods, apparatus, and systems for rendering reflections in a three-dimensional computer graphics environment. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any feature or aspect of the disclosed embodiments can be used in various combinations and subcombinations with one another. For example, one or more method acts or features from one embodiment can be used with one or more method acts or features from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed tools and techniques. These terms are high-level abstractions of the actual operations that are performed. The actual operations that correspond to these terms may vary depending on the particular implementation and are readily discernible by one of skilled in the art. Additionally, as used herein, the term "and/or" means any one item or combination of any items in the phrase.

As used herein, the term "raytracing" encompasses light raytracing operations for rendering or special effects in a 3D computer graphics environment. The term "raytracing" also encompasses other types of applications, such as tracing of rays for collision detection in a physics simulation environment, visibility checking in a model of a real-world scene, tracing of rays to model acoustic phenomena in a sound environment, or tracing of rays in another computer-represented environment. The computer-represented environment can represent a real-world scene (e.g., constructed from imaging/scanning of a real-world scene), represent a synthetic, virtual scene (e.g., constructed entirely from graphics processing tools, or created for a virtual reality application), or represent a hybrid scene that blends results of imaging/scanning of a real-world scene and computer-generated content (e.g., constructed for an augmented reality application).

Although operations described herein are in places described as being performed by a GPU architecture for a gaming console, head-mounted display, or graphics card of a desktop computer system, in many cases the operations can be performed by another type of architecture (e.g., a multi-core CPU architecture) and/or other type of computer system (e.g., smartphone, tablet computer). More generally, various alternatives to the examples described herein are possible. For example, certain techniques described with reference to flowchart diagrams can be altered by changing the ordering of stages shown in the flowcharts, by splitting, repeating or omitting certain stages, etc. The various aspects of the disclosed technology can be used in combination or separately. Different embodiments use one or more of the described innovations. Some of the innovations described herein address one or more of the problems noted in the background. Typically, a given technique/tool does not solve all such problems.

II. Example Computer Systems

FIG. 1 illustrates a generalized example of a suitable computer system (100) in which several of the described innovations may be implemented. The innovations described herein relate to raytracing, which in general involves tracing rays from a viewing point as the rays pass through an image and continue into a computer-represented environment. The raytracing can involve light raytracing operations in a 3D computer graphics environment. Or, the raytracing can be part of another type of application, such as tracing of rays for detection of collisions of particles, objects, etc. in a physics simulation environment, tracing of rays to model acoustic phenomena in a sound environment, tracing of rays as part of visibility checking in a model of a real-world scene, or tracing of rays in another computer-represented environment. Aside from its use in raytracing, the computer system (100) is not intended to suggest any limitation as to scope of use or functionality, as the innovations may be implemented in diverse computer systems, including special-purpose computer systems adapted for graphics processing or modeling of complex environments.

With reference to FIG. 1, the computer system (100) includes processing units (110 . . . 11x) and local memory (118) of a central processing unit ("CPU"). The processing units (110 . . . 11x) are, for example, processing cores on a single chip, and execute computer-executable instructions. The number of processing units (110 . . . 11x) of the CPU depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing unit(s) (110 . . . 11x).

The computer system (100) also includes processing units (130 . . . 13x) and local memory (138) of a GPU. The number of processing units (130 . . . 13x) of the GPU depends on implementation. The processing units (130 . . . 13x) are, for example, single-instruction, multiple data ("SIMD") units of the GPU. A shader unit or other processing block of the GPU can include one or more SIMD units. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. Each element of the SIMD unit can be considered a separate thread of the SIMD unit. A group of n threads for a SIMD unit can also be called a wave or warp. Threads of a given SIMD unit execute the same code in lockstep on (potentially) different data. In some GPU architectures, a SIMD unit can have an extra lane for data that is the same across all threads of the SIMD unit, which results in a group of n threads plus one scalar thread for that SIMD unit (the scalar thread does not execute code like the n threads of the SIMD unit). The local memory (138) may be volatile memory (e.g., registers, cache, RAM), non-volatile memory (e.g., ROM, EEPROM, flash memory, etc.), or some combination of the two, accessible by the respective processing unit(s) (130 . . . 13x). The local memory (138) stores software (180) implementing one or more innovations for the disclosed hybrid raytracing techniques.

The computer system (100) includes shared memory (120), which may be volatile memory (e.g., registers, cache, RAM), non-volatile memory (e.g., ROM, EEPROM, flash memory, etc.), or some combination of the two, accessible by the processing unit(s) (110 . . . 11x) of the CPU and the processing units (130 . . . 13x) of the GPU. The memory (120) stores software (180) implementing one or more innovations for hybrid raytracing techniques as disclosed herein, at least for high-level control of operations performed by threads of the processing units (130 . . . 13x), in the form of computer-executable instructions. In the GPU, a thread (also called an execution thread or thread of execution), in general, executes a sequence of computer-executable instructions and may have data (e.g., defining a state) associated with it in local memory (138) and/or shared memory (120). Threads also execute on processing units (110 . . . 11x) of the CPU, where such a thread, in general, includes a sequence of computer-executable instructions and may have data (e.g., defining a state) associated with it in local memory (118) and/or shared memory (120).

Alternatively, a processing unit can be a processor in an application-specific integrated circuit ("ASIC") or any other type of processor. The processing unit(s) (110 . . . 11x, 130 . . . 13x) can be part of a system-on-a-chip ("SoC").

The computer system (100) includes one or more network interface devices (140). The network interface device(s) (140) enable communication over a network to another computing entity (e.g., server, other computer system). The network interface device(s) (140) can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) (140) convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

A camera input (150) accepts video input in analog or digital form from a video camera, which captures natural video. An audio input accepts audio input in analog or digital form from a microphone (150), which captures audio.

The computer system (100) optionally includes a motion sensor/tracker input (152) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorporate gesture recognition, facial recognition and/or voice recognition.

A game controller input (154) accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (156) and video input (158). The media player (156) can play DVDs, Blu-ray disks, other disk media and/or other formats of media. The video input (158) can accept input video in analog or digital form (e.g., from a cable input, HDMI input or other input).

A video output (160) provides video output to a display device. The video output (160) can be an HDMI output or other type of output. An audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing one or more innovations for hybrid raytracing techniques as disclosed herein. The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The innovations can be described in the general context of computer-readable media. Computer-readable media are any available tangible media that can be accessed within a computing environment. By way of example, and not limitation, with the computer system (100), computer-readable media include memory (118, 120, 138), storage (170), and combinations thereof. The term computer-readable media does not encompass transitory propagating signals or carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. Some code listings shown herein include instructions in High Level Shader Language ("HLSL"). The HLSL code in the code listings can be compiled to run in threads of a processing unit (e.g., a SIMD unit of a GPU). Alternatively, approaches shown herein can be implemented in another programming language.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

For the sake of presentation, the detailed description uses terms like "determine," "receive" and "provide" to describe computer operations in a computing system. These terms denote operations performed by a computer and should not be confused with acts performed by a human being. The actual computer operations corresponding to these terms vary depending on implementation.

III. Overview of Raytracing

In a three-dimensional ("3D") computer graphics environment, raytracing can be used to generate an image from the perspective of a virtual camera or other viewing point. The image includes multiple picture elements ("pixels") through which rays from the viewing point pass and continue into the 3D computer graphics environment. For a given pixel, the path of the ray (primary ray) that passes through the pixel from the viewing point (e.g., the virtual camera) is traced until it intersects with an object in the environment. The surface of the object can have a color associated with it at the intersection point, as well as values that indicate albedo (reflectivity), scattering, refraction, diffusion or another material property. Such values can be interpolated, for example, between values of properties of vertices of the object. At the intersection point, depending on the surface of the object, the ray can be reflected or refracted within the environment, or it can generate diffuse rays, to simulate optical effects such as reflection, refraction/translucence, scattering, and dispersion. The angle of the surface at the intersection point can be determined by interpolating between norms of vertices of the object, or the angle of the surface at the intersection point can be estimated as the angle of a face plane of the object.

A shadow ray can be generated, in the direction of a light source, to simulate optical effects such as shading from the light source (blocking of light from the light source). Such newly generated rays (secondary rays) are similarly traced in the environment, and can generate other rays (tertiary rays), and so on. Successive rays can be generated, for example, until a threshold number of stages is reached or threshold distance is traveled.

Ultimately, the value of the given pixel depends on the color of the surface of the object at the intersection point and results reported back from secondary rays, which may in turn depend on results reported back from tertiary rays, and so on, so as to simulate shadows, reflected light, refracted light, and other effects at the intersection point. Thus, in addition to the color of the surface at the intersected point, the value of the given pixel can depend on the incoming light and material properties of the object at the intersection point.

By focusing on rays that reach the viewing point (e.g., the virtual camera), raytracing is much simpler than tracing the paths of rays of light from light source(s) in the environment, so as to find which ones reach the viewing point. Even so, raytracing is computationally intensive. An image can include hundreds of thousands of pixels, or even millions of pixels. Images can be rendered at a rate of 30 frames per second or higher. Typically, for each pixel, the ray that passes through the pixel is tested to see if it intersects with some subset of the objects in the environment. The environment can include numerous complex objects, which can dynamically change from image to image.

To simplify representation of the objects in the environment, complex objects can be represented with simpler geometric objects such as triangles. For example, the surface of an object can be represented as a set of triangles fitted to the surface. In addition to having vertices and/or edges that define its shape and position in the environment, a given triangle can have an associated color and material properties (or have colors and material properties associated with the vertices of the given triangle, for use in interpolation for intersection points within the given triangle). Any surface can be approximated with a set of triangles. To approximate curves or complex shapes, successively smaller triangles can be used to provide finer levels of detail.

Although geometric objects such as triangles provide a convenient way to represent complex objects in the environment, the resulting representation can include a very large number of geometric objects. For example, a scene can include hundreds of thousands or even millions of geometric objects. These geometric objects can be enclosed in successively larger groups, which are represented in a bounding volume hierarchy ("BVH"). A BVH is tree-structured. Geometric objects in the environment are wrapped in bounding volumes. Bounding volumes enclose geometric objects for the leaf nodes of the tree for the BVH. The leaf nodes are grouped in small sets, which typically correspond to adjoining regions of the environment. A non-leaf node (also called an interior node) encloses a small set of leaf nodes. Sets of non-leaf (interior) nodes are, in turn, enclosed within successively larger bounding volumes for shallower non-leaf (interior) nodes, in a recursive manner, until a "root" node of the BVH encloses all of the non-leaf nodes and leaf nodes. A BVH can be organized as a binary tree (with each non-leaf node having two child nodes), as a quad tree (with each non-leaf node having four child nodes), as an oct tree (with each non-leaf node having eight child nodes), or in some other way.

To test for intersections of a ray with geometric objects in a 3D computer graphics environment, the ray can be tested against a BVH. If there is an intersection between the ray and the bounding volume for the root node, the ray can be tested against the bounding volumes for the respective child nodes of the root node, and so on. In this way, the ray can be tested against successively smaller, enclosed bounding volumes. Testing for an intersection between the ray and a bounding volume is relatively simple if the shape of the bounding volume is a sphere or box. When there is an intersection between the ray and the bounding volume of a leaf node, the ray can be tested for intersections with the geometric objects, e.g., triangles, enclosed by the bounding volume of the leaf node. This is an example of ray-triangle intersection testing.

At any stage, if a ray does not intersect a given bounding volume, further tests against bounding volumes (and geometric objects) within the given bounding volume can be skipped. Stated differently, bounding volumes for child nodes need not be evaluated if the bounding volume for their parent node is not intersected. Similarly, geometric objects (such as triangles) in a leaf node need not be evaluated if the bounding volume for the leaf node is not intersected.

A ray-triangle intersection test is used when a ray is tested for intersections with one or more triangles. There are many different approaches to performing ray-triangle testing in various application areas. Ray-triangle intersection testing is commonly used in computer graphics. In addition, ray-triangle intersection testing is widely used in scene modeling, physical simulations, collision detections, visibility checking, and various real-time processing scenarios. In some previous approaches, for example, given the vertices and/or edges of a triangle, a ray-triangle test determines whether a given ray intersects the triangle. The ray has an origin and a direction. The ray-triangle intersection test finds the distance from the ray origin to the intersection point, as well as whether the intersection point is inside the triangle that is defined by the vertices/edges. Despite attempts to reduce the complexity of ray-triangle intersection testing in previous approaches, ray-triangle intersection testing remains a very computationally-intensive process.

Figure 2:
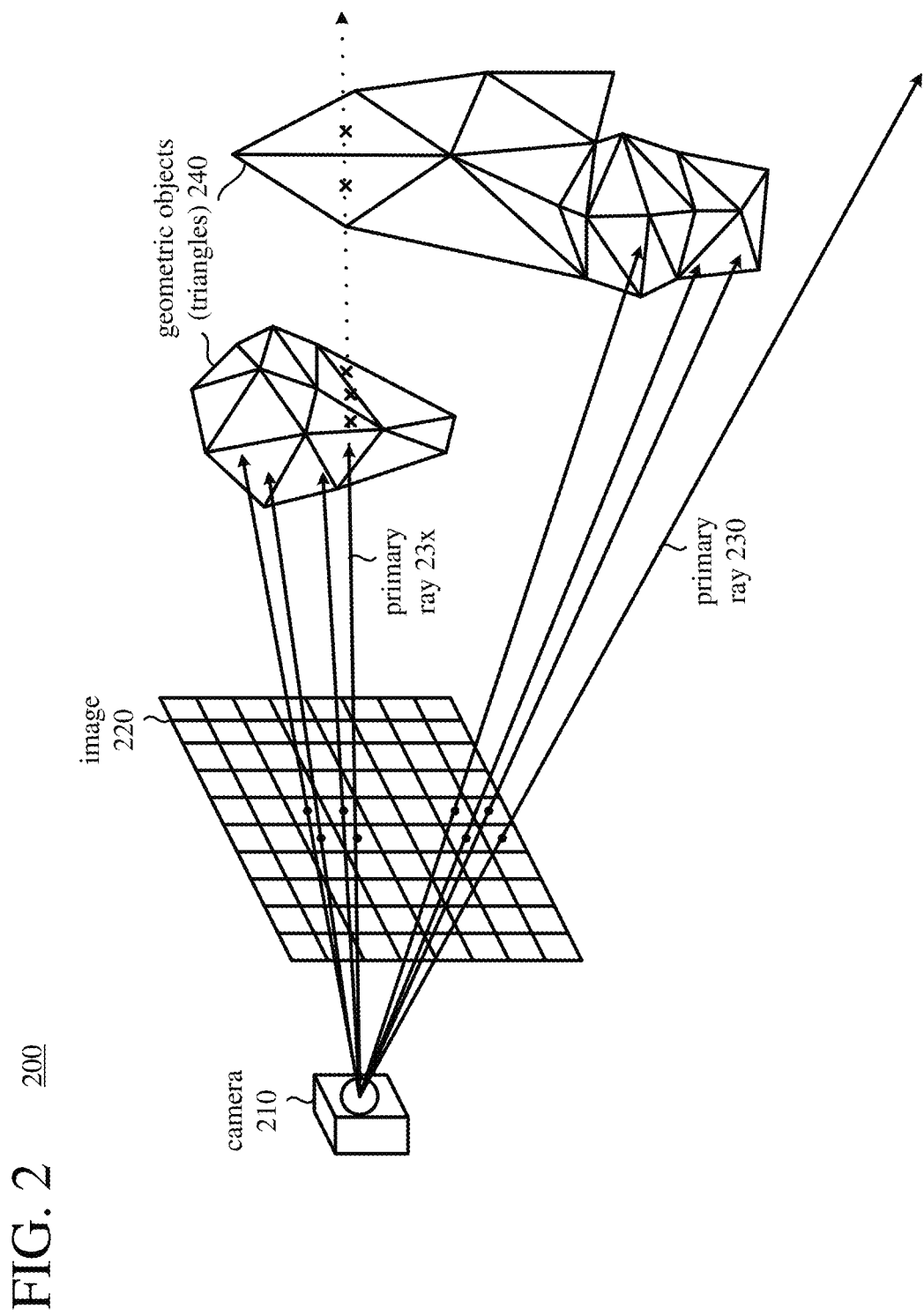
FIG. 2 is a diagram illustrating an example of raytracing in a 3D computer graphics environment.

FIG. 2 shows an example (200) of raytracing in a 3D computer graphics environment. The raytracing generates an image (220) from the perspective of a virtual camera (210), which represents a viewing point. Rays (230 . . . 23x) from the virtual camera (210) pass through pixels of the image (220) into the environment. The environment includes geometric objects (240), which are triangles in FIG. 2. The triangles are fitted to the surfaces of more complex shapes in the environment. For the sake of illustration, FIG. 2 shows a very small image (220) and a handful of geometric objects (240). In practice, an image may include hundreds of thousands or even millions of pixels, and the environment may include hundreds of thousands or even millions of geometric objects (240).

The rays (230 . . . 23x) from the virtual camera (210) (also called view rays or camera rays) are an example of primary rays. For a given pixel of the image (220), the path of the primary ray (230 . . . 23x) that passes through the pixel is traced until it intersects with one of the geometric objects (240) in the environment. In FIG. 2, each of the rays (230 . . . 23x) ends at an intersection point if it intersects one of the geometric objects (240). In FIG. 2, one of the primary rays (230) does not intersect any of the geometric objects (240). A given ray can potentially intersect multiple geometric objects (240), as shown for one of the rays (23x) with multiple intersections marked with x's. In this case, the intersection closest to the virtual camera (210) is counted as the intersection of the primary ray (23x).

Each of the geometric objects (240) has vertices and/or edges that define its shape and position in the environment. In addition, the surface of each of the geometric objects (240) can have a color associated with it, as well as values that indicate albedo (reflectivity), scattering, refraction, diffusion or another material property (or, vertices of the geometric object (240) can have associated colors and material properties, for use in interpolation for intersection points within the geometric object (240)). At an intersection point, depending on the surface of the geometric object (240) at the intersection point, a ray (230 . . . 23x) can be reflected or refracted within the environment, or it can generate diffuse rays, to simulate optical effects such as reflection, refraction/translucence, scattering, and dispersion. Also, for each light source, a shadow ray can be generated from the intersection point, in the direction of the light source, to simulate optical effects such as shading from the light source (that is, blocking of light from the light source).

Reflected rays, refracted rays, diffuse rays, and shadow rays that stem from the intersection point of a primary ray (230 . . . 23x) are examples of secondary rays. Such secondary rays are similarly traced in the environment, and can generate other rays (tertiary rays), and so on. Successive rays can be generated, for example, until a threshold number of stages is reached or threshold distance is traveled. Ultimately, for a given pixel of the image (220), the value of the given pixel depends on the color of the surface of the object (240) at the intersection point as well as results reported back from secondary rays, which may in turn depend on results reported back from tertiary rays, and so on. In this way, the raytracing can simulate shadows, reflected light, refracted light, and other effects at the intersection point for the primary ray (230 . . . 23x). Thus, in addition to the color of the surface at the intersected point for the primary ray (230 . . . 23x), the value of a given pixel of the image (220) can depend on the incoming light and material properties of the object at the intersection point for the primary ray (230 . . . 23x).

Although geometric objects (240) such as triangles provide a convenient way to represent complex objects in the environment, the resulting representation can include a very large number of geometric objects (240). To organize the geometric objects (240) and simplify the process of finding intersection points for rays, the geometric objects (240) can be enclosed in successively larger groups, which are represented in a bounding volume hierarchy ("BVH").

Figure 3:
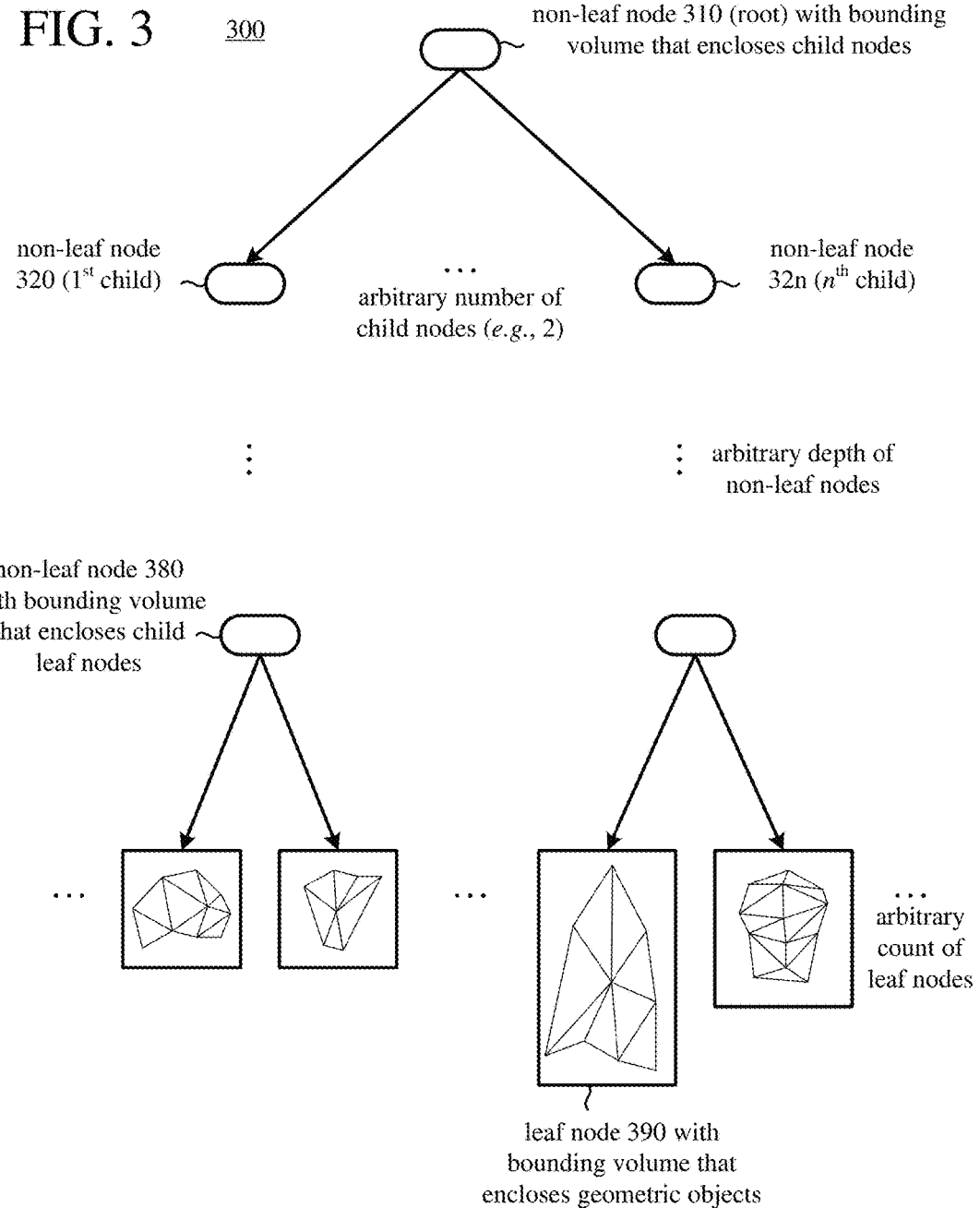
FIG. 3 is diagram illustrating an example of bounding volume hierarchy ("BVH") for geometric objects in the environment of FIG. 2.

FIG. 3 shows an example (300) of BVH for geometric objects in the environment of FIG. 2. The BVH (300) is structured as a tree. For a leaf node (390) of the BVH (300), a subset of the geometric objects (240) in the environment is wrapped in a bounding volume. The bounding volume is typically a sphere (that is, a parametric sphere) or box (that is, a rectangular prism or cubic volume). For example, the bounding volume is an axis-aligned bounding box. In the BVH (300) of FIG. 3, the bounding volumes are bounding boxes. Collectively, bounding volumes for leaf nodes of the BVH (300) enclose all of the geometric objects (240) of the environment.

The leaf nodes are grouped in small sets, which typically correspond to adjoining regions of the environment. A non-leaf node (380), which can also be called an interior node, has a bounding volume that encloses a small set of leaf nodes, which are the child leaf nodes of the non-leaf node (380). At the level of the BVH (300) above the leaf nodes, non-leaf nodes have bounding volumes that, collectively, enclose all of the leaf nodes. In a recursive manner, sets of non-leaf nodes at a given level are, in turn, enclosed within successively larger bounding volumes through an arbitrary depth of non-leaf nodes. Eventually, a root node (310) of the BVH (300) encloses all of the non-leaf nodes and leaf nodes of the BVH (300).

As shown in FIG. 3, a non-leaf node (310, 380) has a bounding volume that encloses child nodes of the non-leaf node. In FIG. 3, the root node (310) has non-leaf nodes (320 . . . 32n) for a $1^{st}$ child through $n^{th}$ child. In general, each non-leaf node (310, 380) has an arbitrary number of child nodes (e.g., 2, 4, 8). Typically, each non-leaf node of the BVH (300) has the same number of child leaf nodes. Thus, the BVH (300) can be organized as a binary tree (with each non-leaf node having two child nodes), as a quad tree (with each non-leaf node having four child nodes), as an oct tree (with each non-leaf node having eight child nodes), or in some other way.

IV. Example Hybrid Approaches for Modeling Light Reflection

As noted, one of the most widely used techniques for modeling light reflection is known as "screen space reflections" or "SSR". As the name implies, screen space reflections is a technique the reuses screen space data to calculate reflections. However, because the SSR technique is limited to using screen space data, it can create numerous anomalies, artifacts, and/or omissions.

Figure 4:
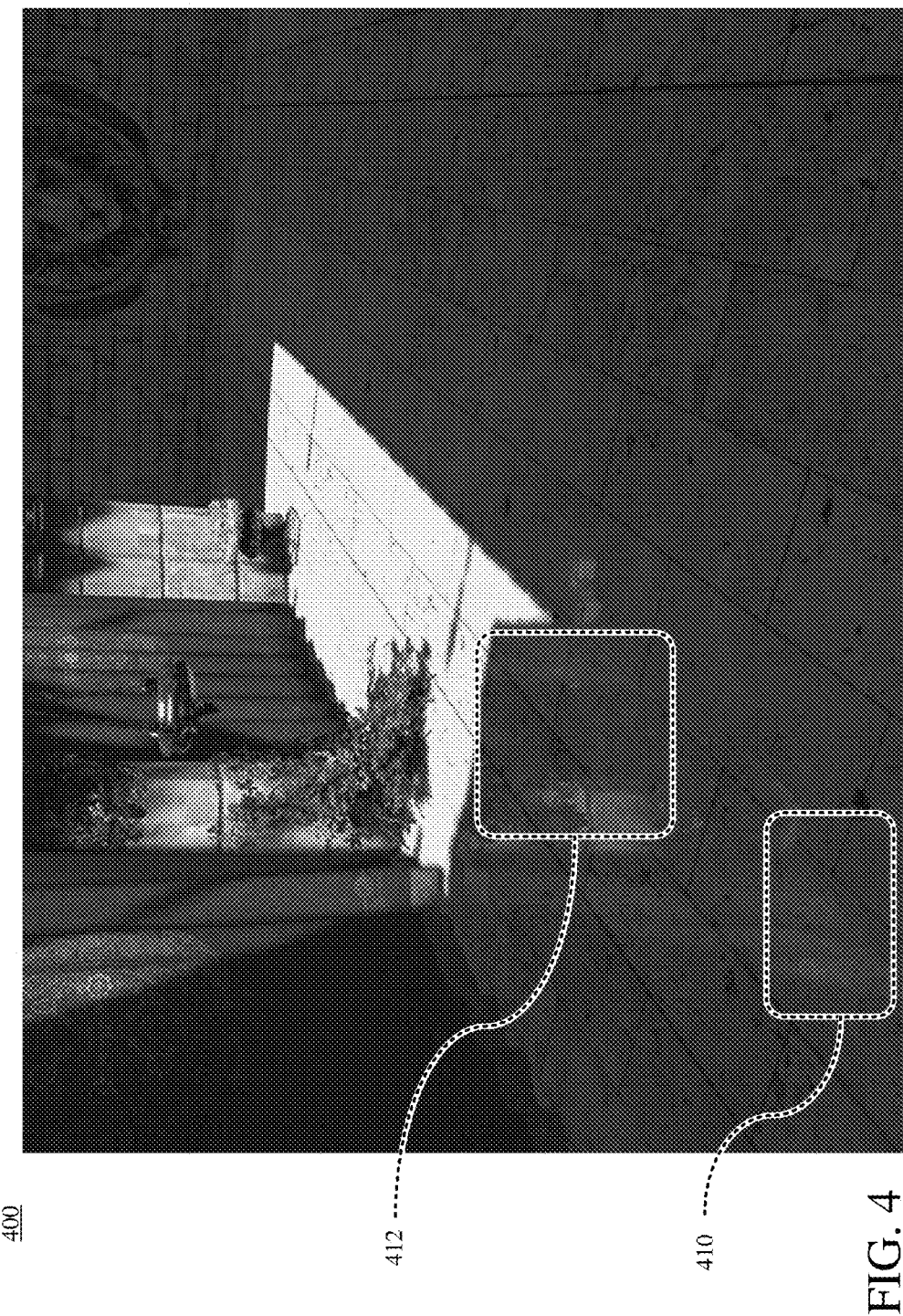
FIG. 4 is a screen shot of a three-dimensional computer-environment as viewed from a first-person virtual camera origin.
Figure 5:
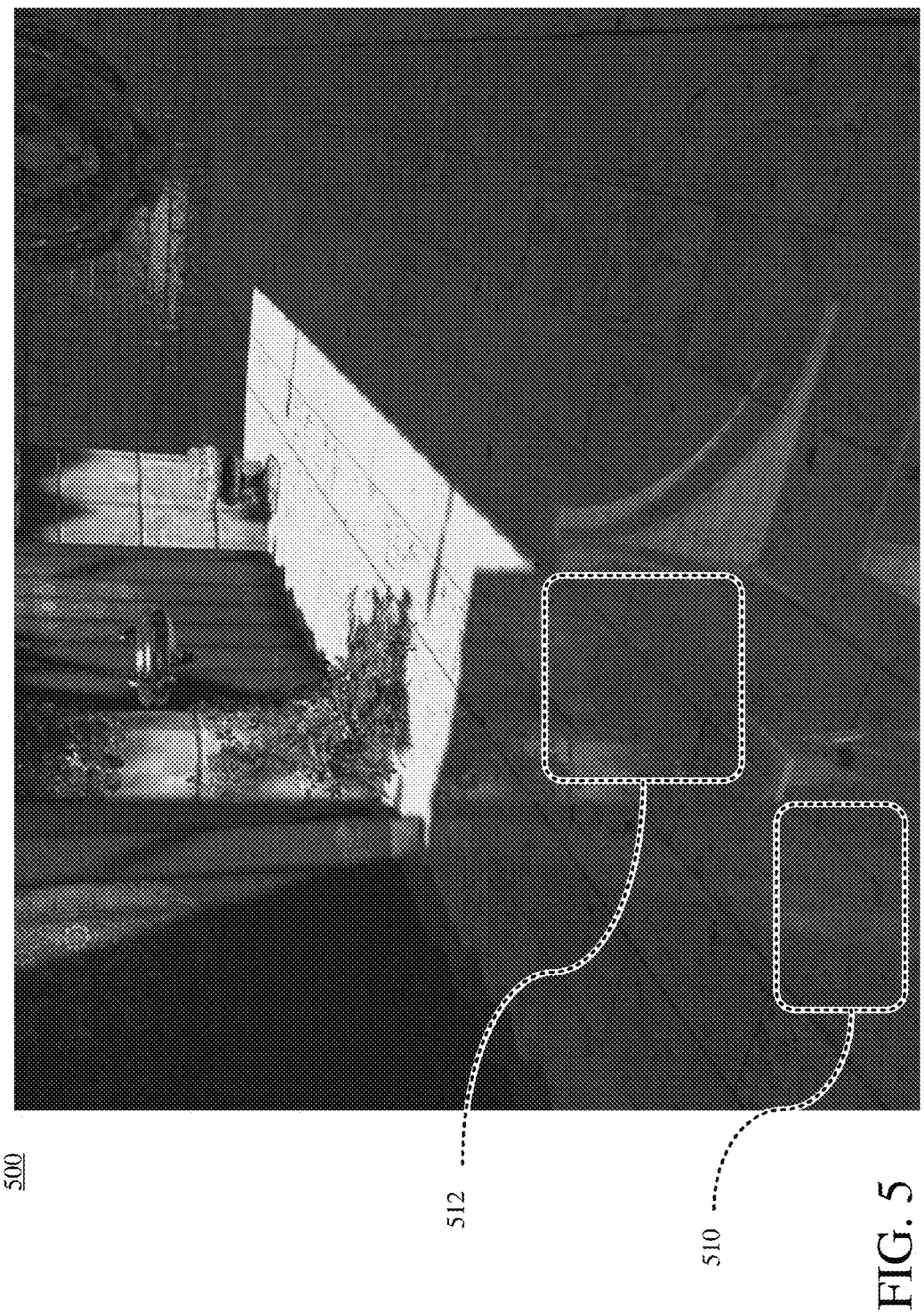
FIG. 5 is a screen shot that supplements the SSR technique with a raytracing technique in accordance with embodiments of the disclosed technology.
Figure 6:
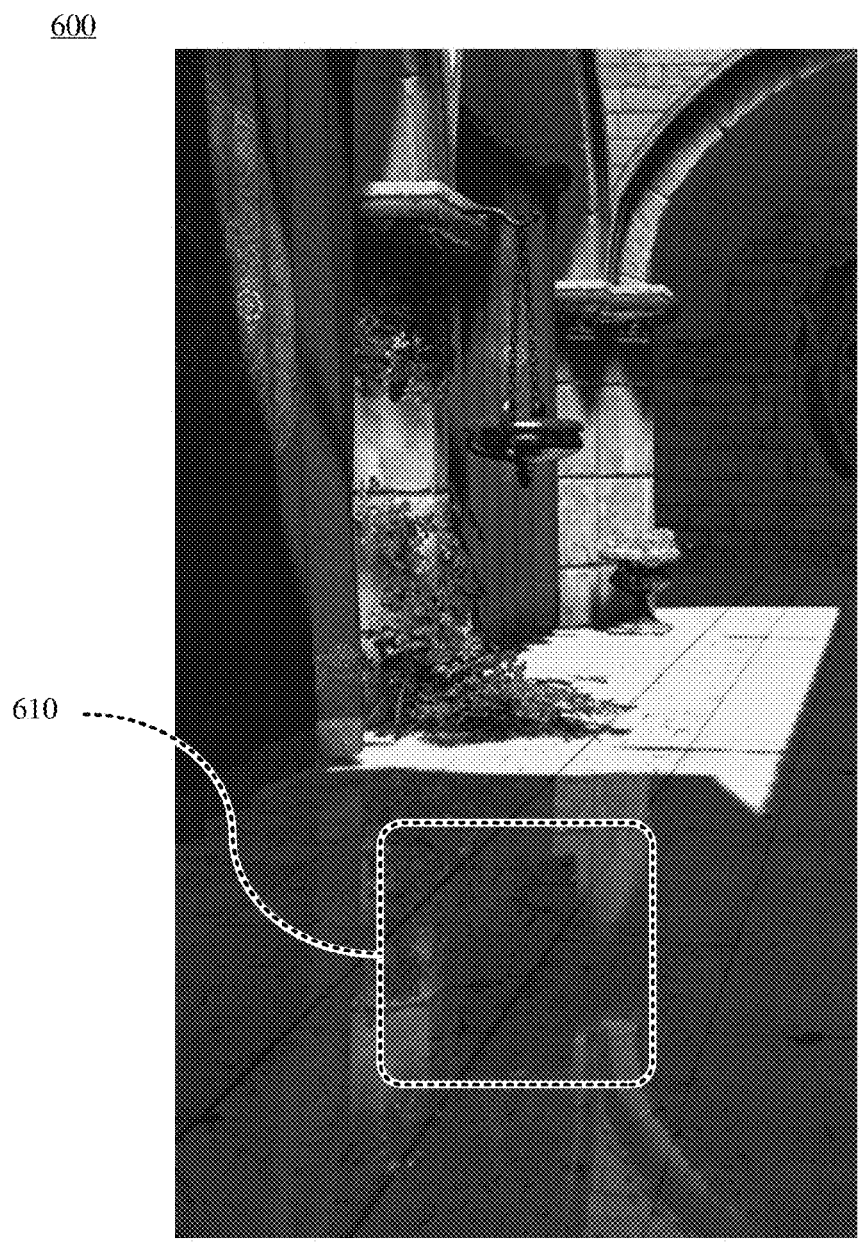
FIG. 6 is a screen shot of another three-dimensional computer-environment as viewed from a first-person angle.
Figure 7:
FIG. 7 is a screen shot that supplements the SSR technique with a raytracing technique in accordance with embodiments of the disclosed technology.

FIGS. 4 and 6 are screen shots (400) and (600) that show screens rendered using only SSR. FIGS. 5 and 7 are screen shots (500) and (700) that show screens rendered using SSR supplemented with raytracing in accordance with embodiments of the disclosed technology.

In particular, FIG. 4 is a screen shot (400) of a three-dimensional computer-environment as viewed from a first-person camera origin. In this image, the rendering of light reflections was performed using only the SSR technique. A few notable artifacts appear in the screen shot (400). For instance, as shown at (410), the reflection of the top of the drapery is cut off prematurely because the SSR technique does not allow for reflections for objects out of the screen space. This leads to an unrealistic aberration of the environment being modeled and leaves portions of the reflection entirely incomplete. Further, as shown at (412), the reflection of the hanging lantern includes large blacked-out portions that do not accurately represent the reflective light that would actually be present in a true, realistic environment.

FIG. 5 is a screen shot that supplements the SSR technique with a raytracing technique in accordance with embodiments of the disclosed technology. For instance, as shown at (510), the reflection of the top of the drapery that was previously cut off is now completed with a reflection of the top of the drapery as generated by a raytracing technique. Further, as shown at (512), the reflection of the hanging lantern now no longer includes the blacked-out portions of FIG. 4, but fills in the pixels that would realistically be reflected.

FIG. 6 is a screen shot (600) of another three-dimensional computer-environment as viewed from a first-person angle. In this image, the rendering of light reflections was performed using only the SSR technique. A few notable artifacts appear in the screen shot 600. For instance, as shown at (610), the reflection of the hanging lantern includes large blacked-out portions that do not accurately represent the reflective light that would actually present in a true, realistic environment.

FIG. 7 is a screen shot that supplements the SSR technique with a raytracing technique in accordance with embodiments of the disclosed technology. For instance, as shown at (710), the reflection of the hanging lantern now no longer includes the blacked-out portions of FIG. 4, but fills in the pixels that would realistically be reflected.

Figure 8:
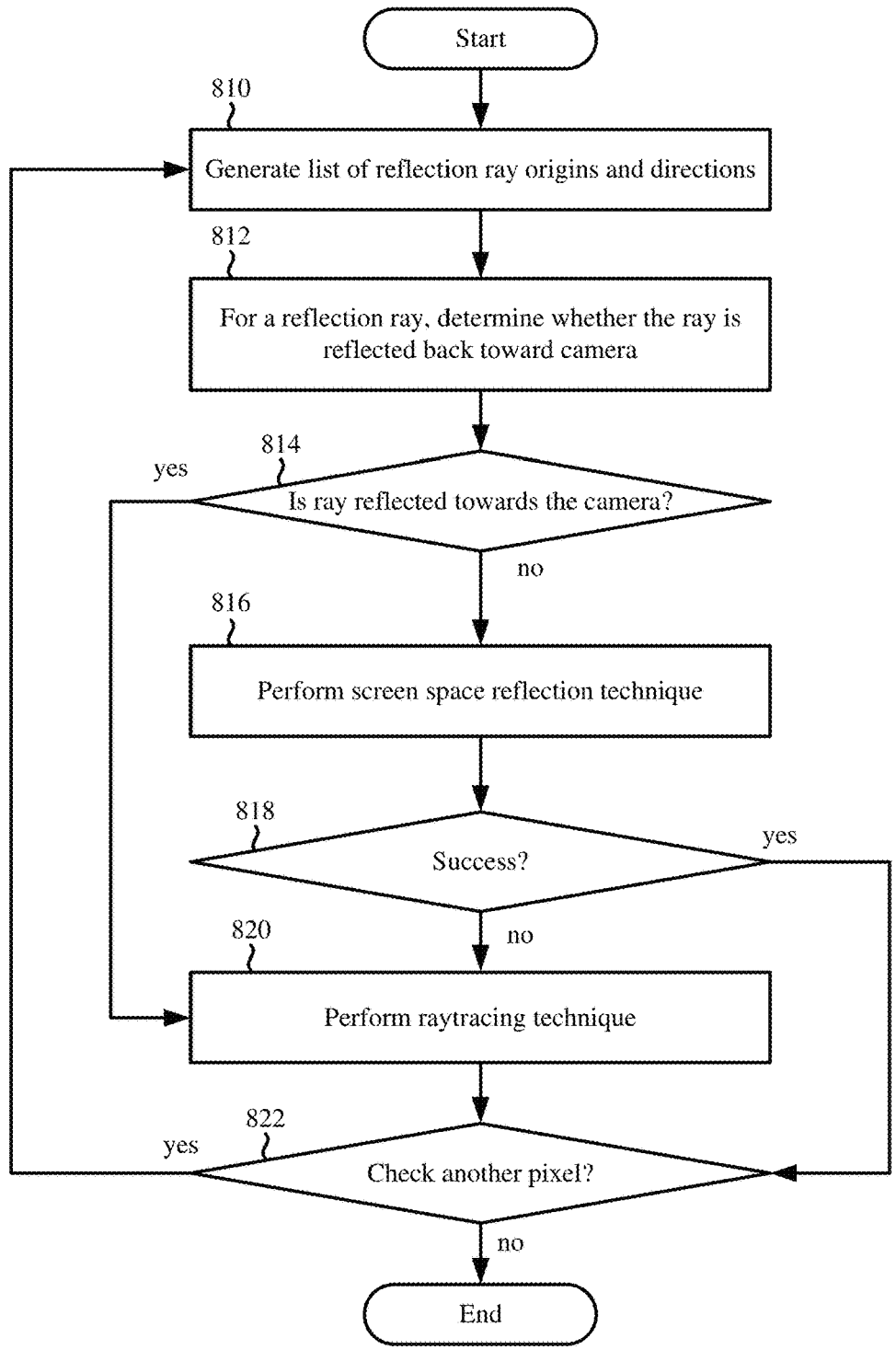
FIG. 8 is a flowchart of an example embodiment for performing a hybrid technique for rendering pixels representing reflective surfaces in accordance with embodiments of the disclosed technology.

FIG. 8 is a flow chart (800) of an example technique for performing a hybrid raytracing technique in accordance with the disclosed technology. The technique (800) can be performed, for example, by one or more processing units of a computer system that implements a graphics tool or other raytracing tool. In some example implementations, the processing units are shader units or other processing blocks of a GPU. Alternatively, the processing units can be processor cores of one or more CPUs. In addition to representing a new approach to rendering reflections, the example technique of FIG. 8 provides numerous technical advantages. For example, the example technique improves the functioning of the computer itself by providing a hybrid approach that not only improves the accuracy of the resulting image but improves the computational, power, and/or memory efficiency of the rendering process by balancing the computationally intensive raytracing process with a less burdensome technique (e.g., SSR technique). Further, because the technique of FIG. 8 allows the rendering of an image to be performed more quickly than using raytracing alone, the technique helps enable real-time raytracing with little or no reduction to the desired framerate (e.g., 30 frames per second).

At (810), a list of reflection ray origins and directions is generated. In some examples, the reflection ray origins are represented as three values (e.g., floating point Cartesian values x, y, z), which can be normalized and can be referred to as O. Further, the reflection ray direction can also be represented by three values (e.g., floating point Cartesian values x, y, z), which can be normalized and can be referred to as D. The list can be generated using various techniques. For instance, in one example implementation, the list is generated from the normal information (information indicating the direction of the normal from the reflective surface) and depth information (the distance from the virtual camera to the pixel) that is commonly available in a game engine. For instance, the normal information and depth information can be obtained from a geometry buffer that is computed within a game engine as part of rendering the frame. It is straightforward to obtain the origin and direction information from this normal information and depth information. In this regard, since the geometry buffer (g-buffer) contains normal and depth values at each pixel, it is possible to construct the reflection vector origin and direction from that information. For example, the reflected ray origin in world space can be obtained by: (a) computing a projection space homogenous vector from the integer pixel coordinates (X, Y) and its depth D (e.g., $O_p$=[X/ScreenWidthIn Pixels)*2−1), ((Y/ScreenHeightInPixels)*2−1), D, 1]; (b) multiplying the projection-space homogeneous coordinate for that pixel with the inverse of the world-view-projection matrix (e.g., $O_p'$=Inverse(WorldViewProjection Matrix)*$O_p$); and (c) projecting the vector back to world space by dividing it out (e.g., $O_w=O_{p'.xyz}/O_{p'.w}$). As for the ray's reflected direction, one can use a regular reflection formula. For instance, as one example, let a per-pixel world-space normal be N and a world-space view direction from the virtual camera origin to the pixel's $O_w$ coordinate be V; then, the vector to be obtained is R=V−2*dot(V, N)*N.

It should also be noted that the list of reflection rays origins and directions concerns reflection rays, thus pixels that have a non-reflective surface (e.g., sky or cloth, or other non-reflective surface) will be excluded from the list, thereby further reducing the computational burden of the problem being addressed.

At (812), a selected reflection ray for a pixel is considered for image processing and a determination is made as to whether the reflection ray is reflected back toward the virtual camera or not (but may still be reflected into the scene). The order in which the reflection rays are considered can vary from implementation to implementation. For instance, they may be considered in a raster order, a reverse raster order, a weighted order based on location in the screen (e.g., weighted toward the center of the screen), or any other order.

A number of techniques can be used to determine if the ray is being reflected back toward the virtual camera.

For instance, for each reflection ray, a vector dot product can be used. For instance, the dot product, R dot V can be performed, where V is the view vector (which starts at the virtual camera origin and ends at the pixel, and which may be normalized (e.g., to have a length of 1)), and where R is the reflection vector (which starts from the reflection ray origin O and has a ray direction D). Further, the dot product can be computed in projection space. If the result of R dot V (which is a positive or negative scalar value) is negative, then the reflection ray is not directed to the virtual camera; if the result of R dot V is positive, then the reflection ray is directed to the virtual camera. It should be understood that variations of the described dot product computation can also be used. For example, a half vector H can be used in place of R as known in the art.

Another example implementation for determining whether a reflection ray is directed at the virtual camera is shown as code 900 in FIG. 9. Briefly, the code operates as follows. Given a ray with world-space origin O and direction D, the goal is to determine whether the ray is reflected back to the virtual camera in projected space. To do so, and in this example, the coordinates of a point along the ray that is sufficiently far from the origin (and potentially toward the virtual camera origin) is computed. For example, a ray end E can be computed in the normalized device coordinate (NDC) space that has a ray length long enough to extend beyond the virtual camera. For instance, in the illustrated embodiment:

$$E=O+D*10$$

As noted, O and E are projected into the normalized device coordinates space.

Then, a further transformation is performed:

$$O'=O*\text{WorldViewProjectionMatrix}$$

$$E'=E*\text{WorldViewProjectionMatrix}$$

where the "WorldViewProjectionMatrix" is the matrix that moves the vertices into the world space that is viewed by the virtual camera. Now, the two points are in homogenous space where the z-axis points away from the virtual camera. Then, the z-axis coordinates of those two points are subtracted from one another (starting with the Ez value) to see if the result is negative:

$$\text{DeltaZ}=E_z-O_z.$$

If DeltaZ is negative, then the ray is pointing at the virtual camera; if DeltaZ is positive, the ray is pointing away from the virtual camera. In other implementations, the equations can be inverted to arrive at an equivalent result. Conceptually, you are determining whether the ray is reflected toward the virtual camera and has a chance to be performed with SSR.

At (814), if it is determined that the ray is reflected toward the virtual camera, the process proceeds to (820), where raytracing is performed for the pixel. The raytracing approach used for the pixel can be as described above or can be any other suitable raytracing approach, such as any of those described in, for example, U.S. patent application Ser. No. 15/818,540 entitled "RAY-TRIANGLE INTERSECTION TESTING WITH TETRAHEDRAL PLANES" and filed on Nov. 20, 2017; U.S. patent application Ser. No. 15/862,521 entitled "NON-DIVERGENT PARALLEL TRAVERSAL OF A BOUNDING VOLUME HIERARCHY" and filed on Jan. 4, 2018; and/or U.S. Patent Application No. 62/547,679 entitled "NON-DIVERGENT PARALLEL TRAVERSAL OF A BOUNDING VOLUME HIERARCHY" and filed on Aug. 18, 2017, all of which are hereby incorporated herein by reference.

Also at (814), if it is determined that the ray is not reflected into the virtual camera, it is still possible for the ray to be reflected into the scene. Thus, the process proceeds to (816), where a screen space reflection technique is first performed for the ray.

At (816), the screen space reflection technique performed for the pixel can be any suitable screen space reflection technique. Further, it is still possible that the screen space reflection technique will fail for the pixel (e.g., because the pixel data that should be reflected extends beyond the screen space). Accordingly, at (818), a determination is made as to whether the screen space reflection succeeded for the pixel. If so, then the process proceeds to (822), where it is determined whether any further pixels remain to be processed. If the screen space reflection technique does not succeed for the pixel, then raytracing is performed for the pixel at (822). Again, the raytracing approach used for the pixel can be as described above or can be any other suitable raytracing approach, such as any of those described in, for example, U.S. patent application Ser. No. 15/818,540 entitled "RAY-TRIANGLE INTERSECTION TESTING WITH TETRAHEDRAL PLANES" and filed on Nov. 20, 2017; U.S. patent application Ser. No. 15/862,521 entitled "NON-DIVERGENT PARALLEL TRAVERSAL OF A BOUNDING VOLUME HIERARCHY" and filed on Jan. 4, 2018; and/or U.S. Patent Application No. 62/547,679 entitled "NON-DIVERGENT PARALLEL TRAVERSAL OF A BOUNDING VOLUME HIERARCHY" and filed on Aug. 18, 2017, all of which are hereby incorporated herein by reference.

With respect to (816) and (818), in some embodiments, the screen space reflection process proceeds along a stepping process looking for intersection points, and when the edge of the screen space is reached without an intersection, the process fails, thereby leading to performance of a raytracing technique (820). Nevertheless, the vertices at which the screen space reflection process failed (which can be a point where the ray is clipped by the frustrum) can be used as a starting point for the raytracing technique. This allows the raytracing technique to move more quickly through its processing. In other embodiments, however, the raytracing can restart from the reflected ray's origin.

After the raytracing technique at (820) is performed, a determination is made at (822) to check if a further pixel is to be processed. If so, then the process repeats from (810); otherwise, the process terminates. The image processing pipeline can then be continued for the frame. For instance, further rendering processes can be performed to produce a final frame that includes the pixel values determined by the technique of FIG. 8 for a reflective surface in the frame. The final frame can then be displayed on a display device.

The technique of FIG. 8 can include a variety of variations in accordance with the principles of the disclosed technology. In general, the variations are aimed at improving the speed with which raytracing is performed for an image or image portion, thereby improving the likelihood that real-time raytracing can be performed without any loss in the desired frame rate.

For instance, in one example embodiment, a reduced resolution image is used for raytracing, thus reducing the number of raytracing operations to be performed. For example, the frame (or portion of the frame in which raytracing is to be performed) can be transformed into a reduced-resolution frame (or portion of the frame). For instance, in some embodiments, the resolution can be reduced by ½ on both x and y axes, resulting in a ¼ total resolution reduction. The reduction in resolution can be by any other factor as well.

After raytracing is performed for a pixel on the reduced resolution image or image portion, the pixel values for the regular resolution image can be computed using any suitable smoothing, blending, or interpolation technique. For example, in some examples, the pixel value obtained from raytracing using the reduced resolution image is used for all of the corresponding pixels in the regular resolution image or image portion. In other examples, the pixel value obtained from raytracing using the reduced resolution image is used as an input value to a smoothing, blending, or interpolation filter in relation to the neighboring values. For example, an average between the pixel value obtained from raytracing using the reduced resolution image with one or more of the neighboring pixels can be computed. In other examples, a bilinear interpolation filter can be applied that includes the pixel value obtained from raytracing using the reduced resolution image and the neighboring pixels. In still further examples, a smoothing or interpolation filter having any number of inputs and weights can be used to arrive at the pixel values of the regular resolution image. In yet another example, a temporal filter is used to smooth the pixel value obtained from raytracing using the reduced resolution image. For instance, the temporal filter can use data from one or more previous frames for the same pixel space to compute the current pixel value.

In further embodiments, a representative normal can be selected for a group of neighboring pixels (e.g., for 4 pixels, 16 pixels, etc.). For instance, in one example implementation, when raytracing is to be performed for a selected pixel (e.g., at (820)), a group of pixels neighboring the selected pixel can be evaluated to see if they have normal directions that are sufficiently similar to the selected pixel such that a single representative normal can be selected for the group and used for raytracing, thereby eliminating the need to perform separate raytracing processing for each pixel in the group. The similarity test can be performed using a variety of techniques such as evaluating whether the normal directions of the pixels in the group are within a threshold percentage (or distance) from one another (e.g., less than 2% difference, less than 5% difference, less than 10% difference, or less than n % difference, where n is a number selected to represent a desired tolerance for specular reproduction). Additionally, in some embodiments, the depth of the group of pixels can be used to alter the threshold percentage (or distance) since pixels that are further away from the virtual camera will create greater reflected ray diffusion when their normals are slightly different. For example, the threshold percentage (or distance) can be reduced as depth increases (according to a linear or other function). Further, if the threshold percentage is satisfied, the representative ray selected for the group can be any one of the normal of the group or the average of the normal in the group.

Another way is to evaluate not just "closeness" of the normal, but also material properties in order to detect whether the normal satisfies an importance sampling criterion. For instance, some material definitions use parametric functions to represent how the light bounces off the material surfaces. With such representations, one can compute an "importance" of each incoming ray of light. For example, if a material has a very strong and "narrow" shiny component (for example, highlights on polished metals), most of the output signal of the function is concentrated in those shiny areas. By using importance sampling, one can detect those parameters and cast more rays there. In other words, importance sampling can be used to detect rays that are more important because the rays will be determined to contribute a lot of "energy" to the output images.

Figure 10:
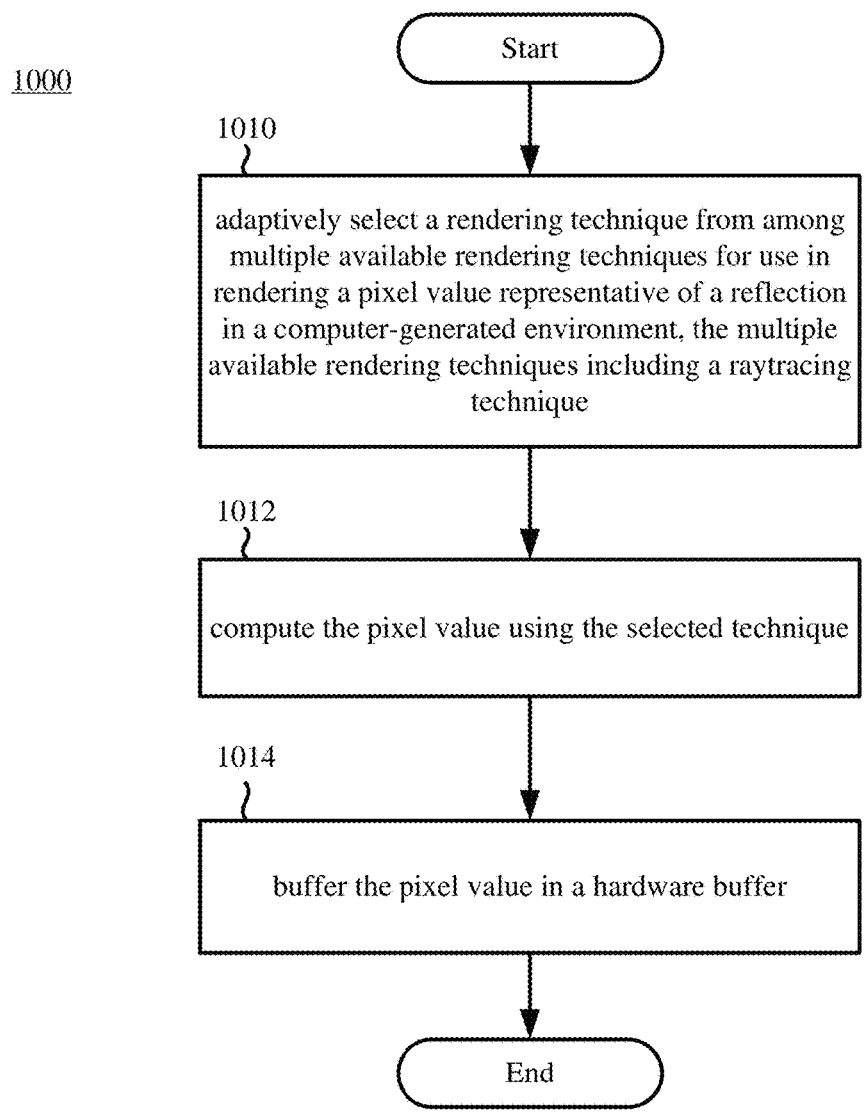
FIG. 10 is a flowchart of an example embodiment for performing a hybrid technique for rendering pixels representing reflective surfaces in accordance with embodiments of the disclosed technology.

FIG. 10 is a flow chart (1000) of an example technique for performing a hybrid raytracing technique in accordance with the disclosed technology. The technique (1000) can be performed, for example, by one or more processing units of a computer system that implements a graphics tool or other raytracing tool. In some example implementations, the processing units are shader units or other processing blocks of a GPU. Alternatively, the processing units can be processor cores of one or more CPUs. In addition to representing a new approach to rendering reflections, the example technique of FIG. 10 provides numerous technical advantages. For example, the example technique improves the functioning of the computer itself by providing a hybrid approach that not only improves the accuracy of the resulting image but improves the computational, power, and/or memory efficiency of the rendering process by balancing the computationally intensive raytracing process with a less burdensome technique (e.g., SSR technique). Further, because the technique of FIG. 10 allows the rendering of an image to be performed more quickly than using raytracing alone, the technique helps enable real-time raytracing with little or no reduction to the desired framerate (e.g., 30 frames per second).

At (1010), a rendering technique is adaptively selected from among multiple available rendering techniques for use in rendering a pixel value representative of a reflection in a computer-generated environment. In the illustrated embodiment, the multiple available rendering techniques include a raytracing technique. In some example implementations, the multiple available rendering techniques further include a screen space reflection technique.

At (1012), the pixel value is computed using the selected technique.

At (1014), the pixel value is buffered in a hardware buffer (e.g., a buffer of a GPU).

In some example implementations, the adaptively selecting the rendering technique comprises: determining whether a reflection ray from the pixel location is reflected toward a virtual camera position of the computer-generated environment; and selecting the rendering technique based at least in part on the determination of whether the reflection ray from the pixel location is reflected toward the virtual camera position of the computer-generated environment. In further example implementations, the adaptively selecting the rendering technique comprises: determining whether a reflection ray from the pixel location is reflected toward a virtual camera position of the computer-generated environment; selecting the raytracing technique if the reflection ray is reflected toward the virtual camera position; and selecting a second technique (e.g., a screen space reflection technique) other than the raytracing technique if the reflection ray is not reflected toward the virtual camera. Further, in some example implementations, when the screen space reflection technique is used, the method further comprises determining that the screen space reflection technique failed for the reflection ray; and performing a raytracing technique for the reflection ray for which the screen space reflection technique failed.

Figure 11:
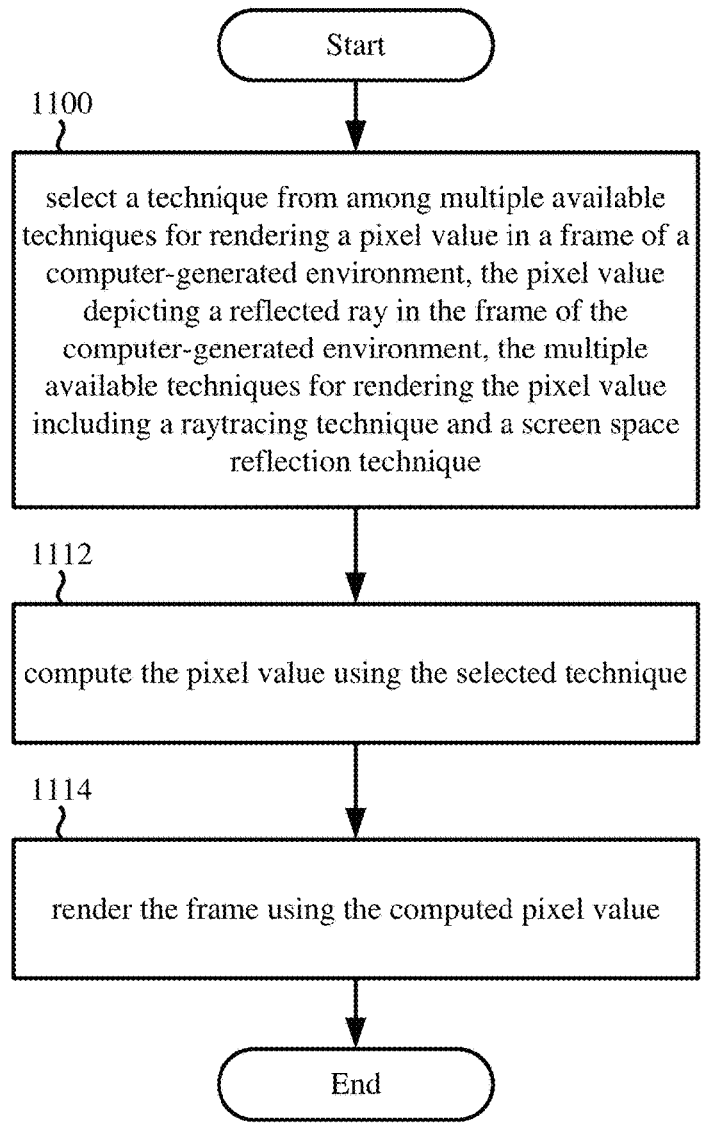
FIG. 11 is a flowchart of an example embodiment for performing a hybrid technique for rendering pixels representing reflective surfaces in accordance with embodiments of the disclosed technology.

FIG. 11 is a flow chart (1100) of an example technique for performing a hybrid raytracing technique in accordance with the disclosed technology. The technique (1100) can be performed, for example, by one or more processing units of a computer system that implements a graphics tool or other raytracing tool. In some example implementations, the processing units are shader units or other processing blocks of a GPU. Alternatively, the processing units can be processor cores of one or more CPUs. In addition to representing a new approach to rendering reflections, the example technique of FIG. 11 provides numerous technical advantages. For example, the example technique improves the functioning of the computer itself by providing a hybrid approach that not only improves the accuracy of the resulting image but improves the computational, power, and/or memory efficiency of the rendering process by balancing the hardware-resource intensive raytracing process with a less burdensome technique (e.g., SSR technique). Further, because the technique of FIG. 11 allows the rendering of an image to be performed more quickly than using raytracing alone, the technique helps enable real-time raytracing with little or no reduction to the desired framerate (e.g., 30 frames per second).

At (1100), a technique is selected from among multiple available techniques for rendering a pixel value in a frame of a computer-generated environment. In this embodiment, the pixel value depicts a reflected ray in the frame of the computer-generated environment. Further, in this embodiment, the multiple available techniques for rendering the pixel value include a raytracing technique and a screen space reflection technique.

At (1112), the pixel value is computed using the selected technique.

At (1114), the frame of the computer-generated environment is rendered using the computed pixel value. For instance, further rendering processes can be performed to produce a final frame that includes the pixel value determined by the technique of FIG. 11 for a reflective surface in the frame. The final frame can then be displayed on a display device.

In some example implementations, the method further comprises using a reduced resolution image of the frame for the raytracing technique (e.g., a one-quarter reduced or other reduced image for the pixel value). In further example implementations, the method further comprises selecting a representative normal for a group of pixel values neighboring the pixel value. In some cases, the representative normal is selected only after determining that the pixel value has a normal that is within a threshold percentage or distance of the group of pixel values.

V. Concluding Remarks

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claim.

What is claimed is:

1. One or more computer-readable media storing computer-executable instructions for causing a computer system, when programmed thereby, to perform operations that reduce the computational burden of rendering pixels depicting reflective surfaces in a frame of a computer-represented environment, the operations comprising:
   generating a list of reflection ray origins and directions for the frame;
   for a selected pixel having a reflection ray:
      determining whether the reflection ray for the selected pixel is reflected back to a virtual camera position of the frame;
      if the reflection ray is determined to be reflected back to the virtual camera position of the frame, performing a raytracing technique to generate a resulting pixel value for the reflection ray; and
      if the selected reflection ray is determined not to be reflected back to the virtual camera position of the frame, performing a screen space reflection technique to generate the resulting pixel value for the reflection ray; and rendering the frame for display on a display device, the rendered frame including the resulting pixel value.

2. The one or more computer-readable media of claim 1), wherein the operations further comprise:
if the screen space reflection technique fails, performing the raytracing technique for the reflection ray.

3. The one or more computer-readable media of claim 1), wherein the determination of whether the reflection ray is reflected back to the virtual camera position for the frame comprises:
computing a dot product; and
evaluating whether a resulting scalar value from the dot product is positive or negative.

4. The one or more computer-readable media of claim 3), wherein the dot product is the dot product of a view vector for the selected pixel and the reflection vector for the selected pixel.

5. The one or more computer-readable media of claim 1), wherein the determination of whether the reflection ray is reflected back to the virtual camera position for the frame is performed by:
computing line segment endpoints comprising the origin of the reflected ray and a point along a direction of the reflected ray;
transforming the line segment endpoints into a projected camera space;
constructing a reflected-ray-in-projected-space from the line segments endpoints by subtracting one from another; and
determining that a direction of the reflected-ray-in-projected-space is facing at the virtual camera, and thereby determining that the original reflected ray was reflected towards the virtual camera.

6. The one or more computer-readable media of claim 1), wherein the reflection ray is determined to be reflected back to the virtual camera position of the frame, and wherein the raytracing technique comprises either (a) using a reduced resolution image of the frame for the raytracing technique; or (b) selecting a representative normal for a group of pixel values neighboring the selected pixel.

7. In a computer system, a method of rendering a pixel depicting a reflection from a reflective surface of a computer-represented environment, the method comprising:
adaptively selecting a rendering technique from among multiple available rendering techniques for use in rendering a pixel value representative of a reflection in a computer-generated environment, the multiple available rendering techniques including a raytracing technique;
computing the pixel value using the selected technique; and
buffering the pixel value in a hardware buffer,
wherein the adaptively selecting the rendering technique comprises:
determining whether a reflection ray from the pixel location is reflected toward a virtual camera position of the computer-generated environment;
selecting the raytracing technique if the reflection ray is reflected toward the virtual camera position; and
selecting a screen space reflection technique if the reflection ray is not reflected toward the virtual camera.

8. The method of claim 7, wherein the adaptively selecting the rendering technique comprises:
determining that a reflection ray from the pixel location is not reflected toward a virtual camera position of the computer-generated environment;
performing a screen space reflection technique for the reflection ray.

9. The method of claim 8, further comprising:
determining that the screen space reflection technique failed for the reflection ray; and
performing a raytracing technique for the reflection ray for which the screen space reflection technique failed.

10. The method of claim 7, wherein the adaptively selecting the rendering technique from among multiple available rendering techniques reduces the computational burden of rendering the frame.

11. A system comprising:
a computer processor; and
one or more computer-readable memory storing computer-readable instructions, which when executed by the computer processor, cause the computer processor to perform a method, the method comprising:
selecting a technique from among multiple available techniques for rendering a pixel value in a frame of a computer-generated environment, the pixel value depicting a reflected ray in the frame of the computer-generated environment, the multiple available techniques for rendering the pixel value including a raytracing technique and a screen space reflection technique, wherein the selecting the technique is based on whether the reflected ray is reflected toward a virtual camera position of the computer-generated environment;
selecting the raytracing technique if the reflection ray is reflected toward the virtual camera position; and
selecting a screen space reflection technique if the reflection ray is not reflected toward the virtual camera;
computing the pixel value using the selected technique; and
rendering the frame of the computer-generated environment using the computed pixel value.

12. The system of claim 11, wherein the method further comprises using a reduced resolution image of the frame for the raytracing technique.

13. The system of claim 12, wherein the reduced resolution image comprises a one-quarter reduced image for the pixel value.

14. The system of claim 12, wherein the reduced resolution image is used to render multiple pixels, and thereby reduces the computational burden of rendering the frame.

15. The system of claim 11, wherein the method further comprises selecting a representative normal for a group of pixel values neighboring the pixel value.

16. The system of claim 15, wherein the representative normal is selected only after determining that the pixel value has a normal that is within a threshold percentage or distance of the group of pixel values.

* * * * *